US008140574B2

(12) United States Patent
Brooks et al.

(10) Patent No.: US 8,140,574 B2
(45) Date of Patent: Mar. 20, 2012

(54) COMMUNITY SEARCH SCOPES FOR ENTERPRISES APPLICATIONS

(75) Inventors: David Andrew Brooks, Providence, RI (US); Hong Dai, Westford, MA (US); Craig Richard Wolpert, Holliston, MA (US); Eric Leonard Masselle, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 430 days.

(21) Appl. No.: 11/117,227

(22) Filed: Apr. 28, 2005

(65) Prior Publication Data
US 2006/0248050 A1 Nov. 2, 2006

(51) Int. Cl.
G06F 7/00 (2006.01)
(52) U.S. Cl. .................................................. 707/781
(58) Field of Classification Search .............. 707/3, 4, 707/5, 1, 2, 9, 781
See application file for complete search history.

(56) References Cited

U.S. PATENT DOCUMENTS

| 5,515,488 | A | | 5/1996 | Hoppe et al. | |
|---|---|---|---|---|---|
| 5,778,368 | A | * | 7/1998 | Hogan et al. | 707/10 |
| 6,216,122 | B1 | | 4/2001 | Elson | |
| 6,411,952 | B1 | | 6/2002 | Bharat et al. | |
| 6,694,316 | B1 | * | 2/2004 | Langseth et al. | 707/10 |
| 7,130,880 | B1 | * | 10/2006 | Burton et al. | 709/203 |
| 2001/0034734 | A1 | * | 10/2001 | Whitley et al. | 707/104.1 |
| 2002/0046208 | A1 | | 4/2002 | Andersson et al. | |
| 2002/0129056 | A1 | * | 9/2002 | Conant et al. | 707/511 |
| 2002/0169768 | A1 | | 11/2002 | Lowe et al. | |
| 2003/0046307 | A1 | | 3/2003 | Rivette et al. | |
| 2003/0131000 | A1 | * | 7/2003 | Bates et al. | 707/7 |
| 2004/0088313 | A1 | * | 5/2004 | Torres | 707/101 |
| 2004/0104931 | A1 | * | 6/2004 | Schmitt | 345/744 |
| 2004/0162871 | A1 | | 8/2004 | Pabla et al. | |
| 2004/0249658 | A1 | * | 12/2004 | Schwerin-Wenzel et al. | 705/1 |
| 2004/0267625 | A1 | * | 12/2004 | Feng et al. | 705/26 |
| 2005/0004889 | A1 | * | 1/2005 | Bailey et al. | 707/1 |
| 2005/0125389 | A1 | * | 6/2005 | Hazzard et al. | 707/3 |
| 2005/0216522 | A1 | * | 9/2005 | Gomes et al. | 707/201 |
| 2006/0129931 | A1 | * | 6/2006 | Simons et al. | 715/705 |
| 2006/0156031 | A1 | * | 7/2006 | Sturms et al. | 713/189 |
| 2006/0184499 | A1 | * | 8/2006 | Potter | 707/1 |
| 2006/0200484 | A1 | * | 9/2006 | Tare et al. | 707/102 |
| 2007/0150562 | A1 | * | 6/2007 | Stull et al. | 709/223 |
| 2007/0208697 | A1 | * | 9/2007 | Subramaniam et al. | 707/3 |
| 2007/0214145 | A1 | * | 9/2007 | Subramaniam et al. | 707/10 |

* cited by examiner

*Primary Examiner* — Amy Ng
(74) *Attorney, Agent, or Firm* — Guerin & Rodriguez LLP

(57) ABSTRACT

Described are a method and apparatus for searching for user relevant information in content repositories using community search scopes. According to the method, a user is presented with a selection of search scopes in which the user is a member. The user selects one of the search scopes according to the desired information and provides a search request that can include, for example, keywords, phrases and data attributes. Searching is performed in each content repository assigned to the search scope if the user is a member of the content repository. Relevant information found in the search content repositories is presented to the user.

11 Claims, 3 Drawing Sheets

COMMUNITY SEARCH SCOPES FOR ENTERPRISES APPLICATIONS

FIELD OF THE INVENTION

The invention relates generally to techniques for searching multiple databases. In particular, the invention relates to a method for defining search scopes tailored to a community of users within a larger group.

BACKGROUND OF THE INVENTION

Site wide search capabilities in enterprise products are often not utilized because of the inability to focus on the data needs of the user. Often the global search functionality is so broad that all available content is searched. Consequently, the search results can include many undesirable items. One solution is to provide a set of search scopes that a user can employ to focus the search on a desired set of content repositories. Although helpful, these search scopes are often fixed in number and are static across the organizational user base. Static scopes often utilize content sources that regularly fail to satisfy the user's needs. Another solution allows each user to define user-specific search scopes. The definition of search scopes, however, requires thorough knowledge of the content domain and can require a significant investment of time for each user in the organization.

In an example based on a large corporate organization, a software engineer in one division (Division A) of the organization desiring to search across all technical documentation and discussion related to the engineer's product (Product A) prefers a search scope referred to as "Product A—Technical Documentation and Discussions." A second software engineer in a different division (Division B) searches for the same type of information but relevant to a different product (Product B) for which the engineer is responsible. The second software engineer prefers a search scope referred to as "Division B—Technical Documentation and Discussions." Each search scope allows access to a set of content repositories such as Teamspaces, Webconferences, Custom Applications, and technical web sites. Some of the repositories may be available to both software engineers. Statically defining these search scopes and others that meet the needs of the different user bases can result in an unmanageable number of search scopes that all users need to review before locating the preferred search scope. Conversely, each detailed search scope has particularly great value to a select group of users. Further complexity arises in defining a single search scope that meets the needs of an entire organization. For example, a search scope labeled "Technical Documents" can have multiple meanings to different user groups.

Current commercially-available products provide a variety of ways in which a user can define and use search scopes. For example, Lotus Workplace™ provides selectable "tabs" across the top of a global search portlet. Each tab depicts a type of content repository such as Teamspaces, Web Conferences, Applications and the like. Selecting one of the tabs enables a user to configure the search scope to access a particular set of content repositories of the type associated with the tab. Fore example, selecting the Teamspaces tab allows the user to specify whether the search utilizes all teamspaces, or whether the search is limited to public teamspaces or "favorite" teamspaces. Disadvantages to this solution include the poor division of content and the fixed set of available search scopes. Users are often unable to search for topics that span multiple content repositories without performing multiple searches. In addition, the types of search scopes are fixed across the entire organization and do not vary according to a user's role in the organization.

In another example, Microsoft Sharepoint™ also provides a global search capability. A site administrator can define any number of search scopes containing the desired set of topics and content repositories. This feature enables the administrator to create search scopes that contain information on a topic that may span multiple content repositories or repository types. All defined search scopes are visible to all users in the organization. Finance employees can see search scopes defining technical content and engineers can see search scopes defining financial content. Consequently, a user sorts through an excessive number of search scopes before finding a satisfactory search scope for the desired content. Furthermore, a single search scope can have different meanings throughout the organization, however, the search scope contains only one set of content repositories for all users. The effectiveness of the search is less than desired because the search results include content that is not directly applicable to the user. Moreover, the definitions of search scopes implemented in the Sharepoint application are limited to the site administrator. To create effective search scopes, the site administrator needs to acquire knowledge of all the different user requirements and content domains for the entire organization.

Public Search sites such as Google™ provide the ability to limit search results on certain characteristics such as language, site, location, and format. The available predefined constraints are the same for the entire user base. Google and other public sites lack the knowledge of user communities that can exist in a large organization. Intranets associated with large organizations allow for searching similar to that permitted by public search sites; however, intranets can also benefit from the knowledge associated with groups within the organization. Some intranets maintain a list of static search scopes for user selection to customize a search portlet. The selected search scopes become the user's list of search scopes. Thus the number of times a user sorts through unrelated search scopes is reduced; however, users or user groups still cannot define search scopes that meet their particular needs. In addition, each search scope has a single definition across the entire corporation and does not vary based on a user's role or requirements.

What is needed is a method for a user to perform a search for information that avoids the disadvantages described above and presents the user with more relevant search results. The present invention satisfies this need and provides additional advantages.

SUMMARY OF THE INVENTION

In one aspect, the invention features a method for a user to perform a search for information in at least one content repository. One of a plurality of search scopes is selected. Each search scope has at least one content repository and the user is a member of a community defined for each search scope. A search request for information relevant to the user is provided and, for each of the content repositories in the selected search scope, the content repository is search for the requested information if the user is a member of that content repository. Information found in each of the searched content repositories is presented to the user.

In another aspect, the invention features a method for creating a community search scope. At least one content repository is associated with a search scope. Each content repository includes a community of users having access to the content repository. The method also includes defining a community of users for the search scope.

In yet another aspect, the invention features an apparatus for performing a search of at least one content repository for information relevant to a user. The apparatus includes means for presenting a graphical user interface to the user. The graphical user interface including a plurality of search scopes each having at least one content repository and each having the user as a member of a community assigned to the search scope. Each of the content repositories has a membership. The apparatus also includes means for selecting one of the search scopes in the user interface, means for entering a search request for information relevant to the user, and for each of the content repositories for which the user is a member, means for searching the content repository for the requested information. The apparatus also includes means for presenting the information relevant to the user found in the searched content repositories to the user.

In still another aspect, the invention features a computer program product for performing a search for information in at least one content repository. The computer program product comprising a computer useable medium having embodied therein program code. The program code includes program code for selecting one of a plurality of displayed search scopes. Each search scope has at least one associated content repository. The user is a member of a community defined for each search scope. The computer useable medium also has embodied therein program code for generating a search request for information relevant to the user, program code for searching each of the at least one content repositories in the selected search for the requested information if the user is a member of the respective content repository and program code for presenting the information relevant to the user found in each of the at least one searched content repositories to the user.

BRIEF DESCRIPTION OF THE DRAWINGS

The above and further advantages of this invention may be better understood by referring to the following description in conjunction with the accompanying drawings, in which like numerals indicate like structural elements and features in the various figures. The drawings are not necessarily to scale, emphasis instead being placed upon illustrating the principles of the invention.

DETAILED DESCRIPTION

In brief overview, the present invention relates to a method for searching for user relevant information in content repositories using community search scopes. A user is presented with a selection of search scopes in which the user is a member. The user selects a search scope according to the desired information and provides a search request such as one or more keywords, phrases, file attributes and the like. Searching is performed for each content repository assigned to the search scope if the user is a member of the content repository. Relevant information found in the search content repositories is presented to the user.

Community search scopes created in accordance with the present invention provide the customization and management flexibility to satisfy the enterprise search needs of a user base in a large organization. The creation, modification and visibility of community search scopes are permitted for a selected user base that is defined by a system administrator. When one of the users in the user base creates a search scope, the user also defines a community of managers and users assigned to the search scope. Users within the community have the search scope visible within their drop down scope lists when performing a global search. Users assigned as managers of the community search scope have capabilities similar to other users within the community and also have the ability to associate content repositories with the search scope. Each content repository associated with the community search scope can also have its own community of users. Content repositories can also be public, i.e., membership is not limited to a defined community of users.

Referring again to the software engineer example above, the two static search scopes can be combined as a single community search scope labeled "Technical Documentation and Discussions." The communities of software engineers in Division A and Division B are defined as users to the search scope. Consequently, a software engineer in either group see this search scope in his own "drop down list," however, the content repositories included in the search depend on the group membership (i.e., division) of the user that performs the search and the users that are permitted access to the content repositories defined in the search scope. Stated alternatively, a content repository is utilized during the search if the user is a member of a community for which the repository is defined under the search scope and if the user is a member of a community having access to the repository.

Figure 1:
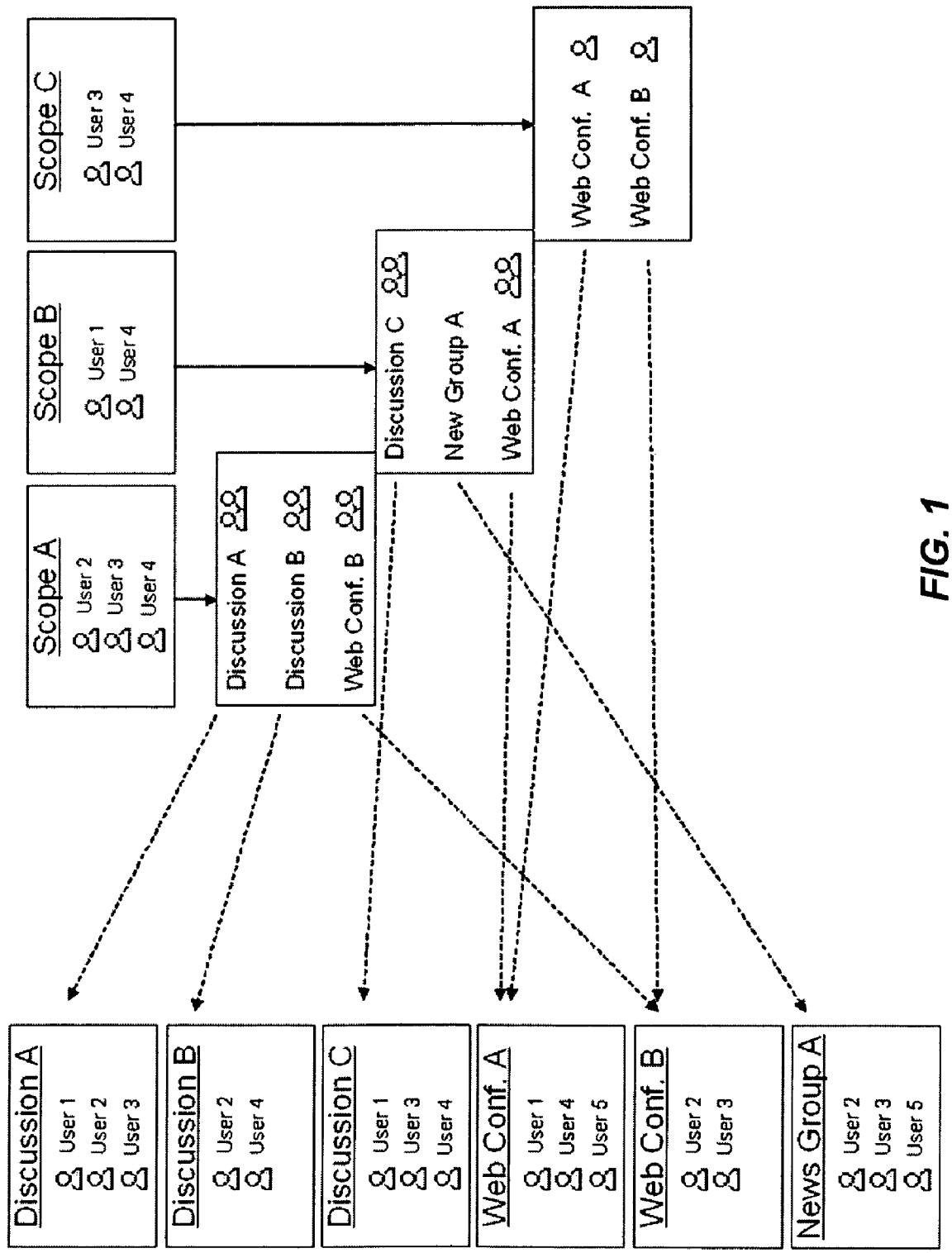
FIG. 1 is a graphical depiction of the relationship between users and content repositories for three community search scopes in accordance with an embodiment of the invention.

FIG. 1 is a block diagram that graphically depicts the relationship between users and content repositories for three exemplary community search scopes. Each search scope has a membership as shown in the respective scope block. Listed for each content repository are the members having access to the repository. User access may be prevented due to physical constraints (i.e., the lack of an available communication link) or prohibited based on security restrictions. Under each scope block is a single block indicating the content repositories defined in the respective search scope. Table 1 describes which repositories are utilized for each search scope for each user. An entry of "NONE" indicates that the search scope is not present in the user's drop down list of community search scopes.

TABLE 1

|  | User 1 | User 2 | User 3 | User 4 |
| --- | --- | --- | --- | --- |
| Scope A | NONE | Discussion A Discussion B Web Conference B | Discussion A Web Conference B | Discussion B |
| Scope B | Discussion C Web Conference A | NONE | NONE | Discussion C Web Conference A |
| Scope C | NONE | NONE | Web Conference B | Web Conference A |

Scope A is defined to search the Discussion A, Discussion B and Web Conference B repositories; however, each user in the membership of Scope A does not have access to all the associated content repositories. Instead, the content repositories searched for each member of Scope A are determined by the overlap of the scope membership and the repository memberships. User 2 is a member of all three content repositories;

therefore a search by User 2 includes all three content repositories. A search by User 3, however, results in only searching Discussion A and Web Conference B repositories. A search by User 4 using Scope A is the most limited because only the Discussion B repository is utilized.

Scope B is defined to search the Discussion C, News Group A and Web Conference A repositories. Based on the memberships of the three content repositories, the two members of Scope B each access the Discussion C and Web Conference A repositories during the search. Neither member of Scope B can search News Group A. A new user added to the membership of Scope B at a later time would search News Group A if the new user is a member of News Group A.

Users of search Scope C are also limited according to repository memberships. Although Scope C is defined to search the Web Conference A and Web Conference B repositories, each member utilizing Scope C searches only a single content repository as determined by the overlap of the scope and repository memberships.

Community search scopes according to the present invention offer many advantages over existing solutions described above. Community search scopes are defined by those most knowledgeable of the content domain, such as an architect, a manager or an individual contributor to the organization. Members added to the search scopes defined by these "super users" benefit from the domain knowledge. In addition, a user only sees search scopes that relate to her role in the organization. A single scope can often meet the needs of multiple groups (i.e., communities) in an organization. Each search scope is interpreted individually for each user according to the user communities defined for each content repository. Furthermore, individual contributors spend little or no time to realize gains from community search scopes. Users of community search scopes have the ability to make visible only those search scopes of interest. Thus users have final control of search scopes and the work required to generate individually customized search scopes is reduced.

Job Role Example

A software engineer logs into a company intranet and is presented with a set of community search scopes: Career Development, Websphere™, and Team Discussions. The Career Development search scope is a corporate wide scope but is customized by team managers to ensure the content repositories satisfy the needs of each manager's employees. In this example, an engineer's manager adds presentations and discussion groups related to becoming an architect. The Websphere search scope spans the company's sales and engineering groups to provide search access to technical documentation. The Team Discussions search scope is corporate wide but is customized at the team level to facilitate the finding of shared information relevant to the user's own team.

An employee in the sales group logs into the company intranet and is presented with the same search scopes available to the software engineer. The sales employee is also presented with an additional search scope labeled "Travel". Searches performed by the sales employee using any of the three scopes common to both software engineers and sales employees results in content that is more relevant to sales employees. For example, the Career Development search scope includes presentations and discussion groups related to meeting sales quotas. The Websphere search scope contains high level documentation to enable a sales member to quickly access necessary information while working with a customer. The Team Discussion search scope facilitates finding shared information, however, unlike the software engineer, the shared technical information relates to the sales group. The Travel scope is only visible to users in the sales group and provides information relevant to corporate traveling (e.g., food budgets and approved hotels).

Corporate Services Example

In this example, an investment company manages investment and benefit plans for a large number of corporate customers. Each customer can log into the investment company's portal site to access plan information. Rather then maintaining separate portal sites, the investment company maintains a single site and implements protection by controlling the information that each customer can access. Customers can scope their searches to topics relevant to specific corporate policies within their organization. In particular, the investment company includes community search scopes labeled "Company A Flex-Benefits" and "Company A Savings Accounts" accessible only to employees of Company A. Additional search scopes labeled "Investment Options" and "Healthcare Options" include content repositories specific to Company A and content repositories relevant to multiple other companies. Company B may also belong to these search scopes with its own specific repositories included. Finally, search scopes labeled "Help" and "Customer Support" are identical for all customers.

People Search Example

A web hosting company hosts intranet sites for a number of small corporations. Each corporation can customize the theme and user experience for their user base. To maintain confidentiality, administrators customizing one corporate intranet are not allowed to view the lists of employees for other corporate intranets. The web hosting company maintains a single server utilizing Lightweight Directory Access Protocol (LDAP) with different nodes representing each corporate user base. Thus all user queries are associated with community search scopes matched to the corporation. The web hosting company, utilizing the People Picker Portlet, is able to generate community search scopes. Each community search scope defines a node or set of nodes in LDAP as its data source and the appropriate set of people as the user community for that search scope. For example, only Company A employees can access a search scope labeled "People in Company A" and only Company B employees can access a search scope labeled "People in Company B." As a result, when a user in Company A performs a people lookup on the portal site, the user accesses the employee listing for Company A but cannot view employees of Company B or other companies maintaining intranet sites on the server.

Figure 2:
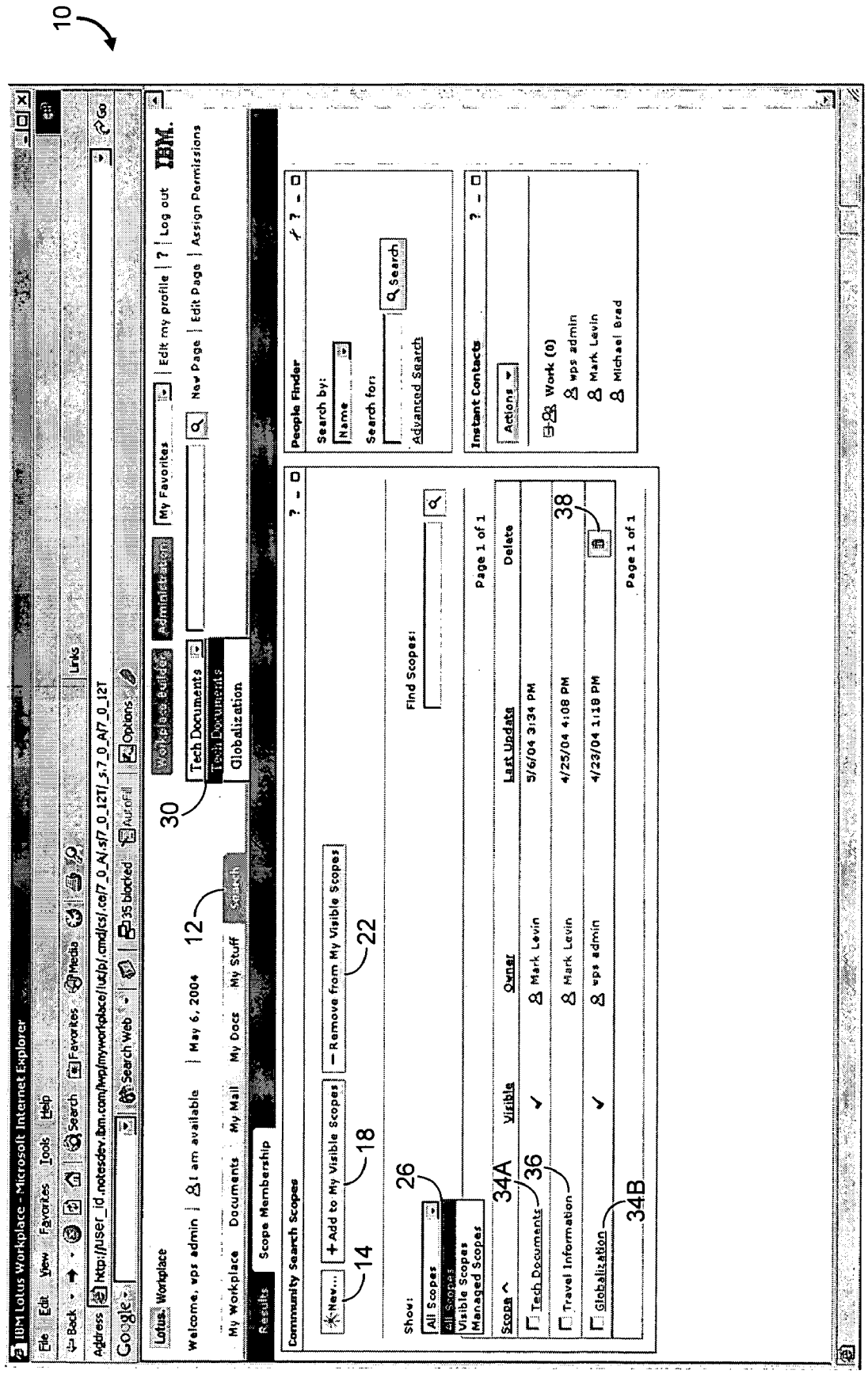
FIG. 2 illustrates a user interface for managing a user's membership in various community search scopes in accordance with an embodiment of the invention.

FIG. 2 shows an exemplary user interface (UI) 10 for a user to manage his membership in various community search scopes. In this example, the UI 10 is referred to as a "Scope Membership" page for a "Search Place" 12 implemented using Lotus Workplace. The user can add a new search scope and add or remove a selected scope to his group of visible search scopes by selecting the corresponding button 14, 18 and 22, respectively. The scopes shown to the user are selected from a drop down menu 26. As shown, the user has selected "All Scopes" from the drop down menu 26 and all three search scopes for which the user is a member are displayed. Visible search scopes ("Tech Documents" and "Globalization") are listed in the drop down menu 30 shown in the global theme. Non-visible search scopes ("Travel Information") are hidden from view. "Visible Scopes" and "Managed Scopes" are subsets of the "All Scopes" view. All users can select and de-select community search scopes that they wish to make visible in their drop down menu 30 (i.e., become active community members). Adding or removing search scopes to the drop down menu 30 is effectively a subscription process for the available community search scopes.

The two search scopes that are managed by the user are displayed as active links 34A and 34B while the other scope for which the user is a member but has no management capability is displayed an unlinked text 36. To edit one of the managed search scopes, the user selects one of the active links 34 and subsequently modifies the content repositories that belong to the search scope. The user can also be the owner of a managed search scope. Owners can delete a search scope by selecting a displayed deletion icon 38. In the present example, the Globalization search scope can be deleted because the user (i.e., wps admin) is the owner. Deleting a community search scope results in removal of the search scope from all user views. The owner is warned of the imminent deletion prior to completion to prevent inadvertent deletion. As illustrated, the user is a manager of the Tech Documents search scope but is not the owner. Consequently, the user can modify the content repositories associated with the Tech Documents search scope; however, the user is not permitted to delete the search scope.

Figure 3:
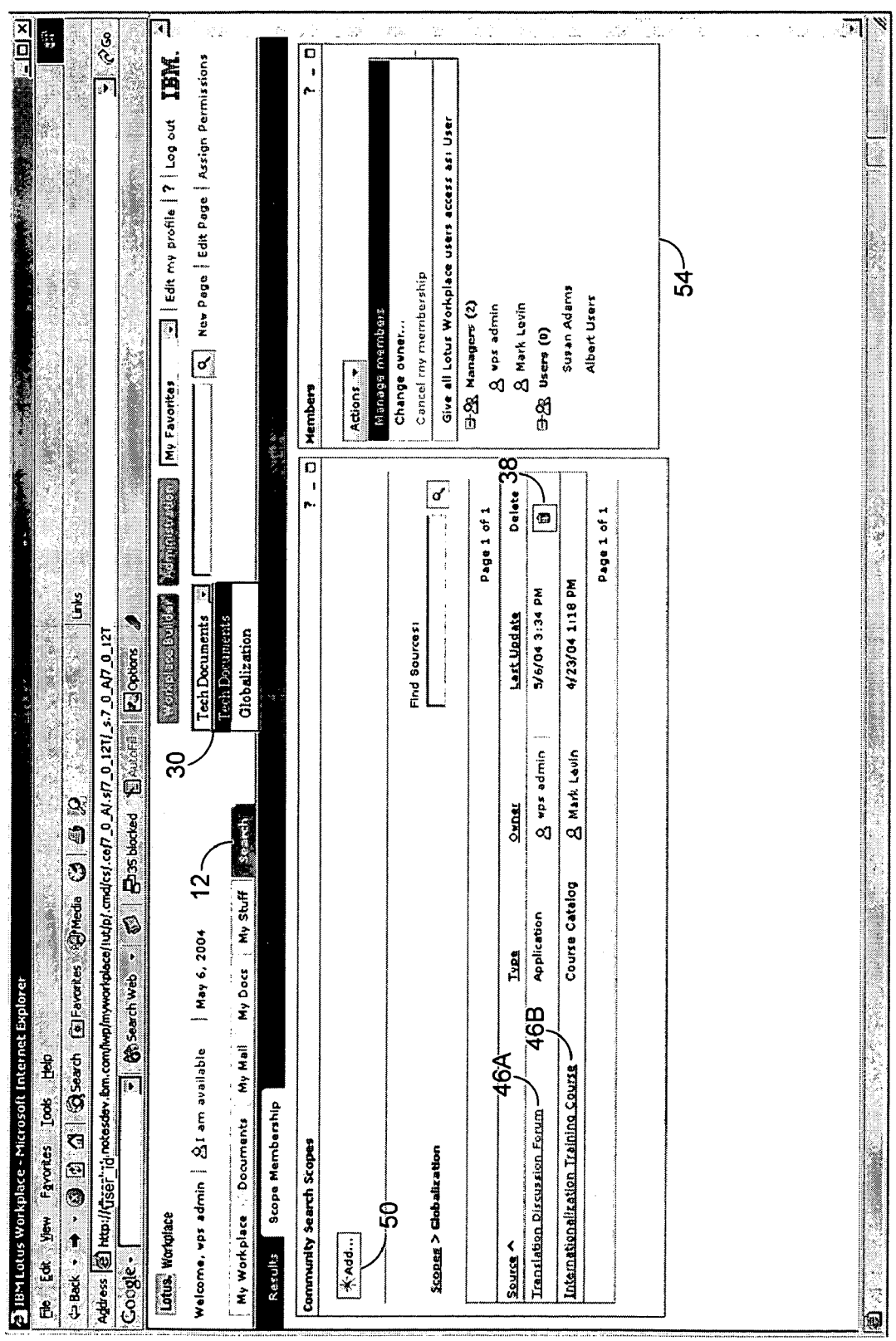
FIG. 3 illustrates a user interface for modifying a community search scope displayed in the user interface of FIG. 2.

FIG. 3 shows a "Globalization" page UI 42 presented to the user in response to the opening of the Globalization link 34B in FIG. 2. Two content repositories belong to the Globalization search scope. One repository is an application associated with an active link 46A titled "Translation Discussion Forum." This content repository was added by the user (i.e., wps admin) and a deletion icon 38 is provided to permit the user to delete the repository from the search scope. The second content repository was added by a different user (i.e., Mark Levin) and is a course catalog associated with an active link 46B titled "Internationalization Training Course." The user can add another content repository to the Globalization search scope by selecting the "*Add" button 50.

A Members subwindow 54 displays all members of the Globalization search scope. Mark Levin and wps admin are managers of the Globalization scope and can therefore modify the search scope. Susan Adams and Albert Users are members of the search scope but are not managers. Consequently, Susan Adams and Albert Users are permitted to make the community search scope visible or hidden, but they cannot modify the search scope. A non-managing member wishing to modify the community search scope can request that a manager modify the search scope. Alternatively, the member can request that the owner give the member manager status.

While the invention has been shown and described with reference to specific embodiments, it should be understood by those skilled in the art that various changes in form and detail may be made therein without departing from the spirit and scope of the invention.

What is claimed is:

1. A method for performing a search for information in at least one content repository, the method comprising:
    creating at a computer, by a first user a search scope defining one or more content repositories to be searched;
    assigning by the first user a community of members to the search scope, the first user being one of the members of the community;
    displaying the search scope to a second user who is a member of the community, an association of content repositories defined for the search scope being different from an association of content repositories defined for one or more other search scopes;
    selecting the displayed search scope;
    generating a search request for information relevant to the second user;
    for each of the content repositories associated with the selected search scope, searching the content repository for information relevant to the second user in response to the second user being a member of a content repository membership of the content repository, wherein each of the content repositories associated with the selected search scope has one and only one content repository membership, wherein each content repository membership corresponds to one and only one content repository; and
    presenting information found in response to the search request in the searched content repositories to the second user.

2. The method of claim 1 wherein at least one of the content repositories is a public repository.

3. The method of claim 1 wherein presenting information comprises presenting a link to the requested information.

4. A method for creating a community search scope, the method comprising:
    associating at least one content repository with a search scope created at a computer by a first user, each content repository having a community of users permitted to access the content repository, an association of content repositories defined for the search scope being different from an association of content repositories defined for a different search scope; and
    assigning by the first user a community of users to be able to use the search scope, the first user being one of the community of users, at least one of the members of the community of users managing the search scope, a second user of the community of users having permission to search the content repository in response to the second user being a member of a content repository membership of the content repository, wherein each of the content repositories associated with the search scope has one and only one content repository membership, and wherein each content repository membership corresponds to one and only one content repository.

5. The method of claim 4 further comprising presenting the search scope to a user in the community of users if the user has requested a visible display of the search scope.

6. The method of claim 4 further comprising deleting at least one content repository associated with the search scope.

7. The method of claim 4 further comprising associating at least one additional content repository with the search scope.

8. The method of claim 4 further comprising designating at least one member of the community of users as a manager of the search scope.

9. The method of claim 4 further comprising deleting management privileges previously assigned to a member of the community of users for the search scope.

10. The method of claim 4 further comprising adding at least one member to the community of users for the search scope.

11. The method of claim 4 further comprising removing at least one member from the community of users for the search scope.

* * * * *